United States Patent [19]

Snyder

[11] 4,056,013
[45] Nov. 1, 1977

[54] BICYCLE TRANSMISSIONS

[75] Inventor: W. Henry Snyder, 4272 McKay St., Salt Lake City, Utah 84107

[73] Assignee: W. Henry Snyder, Salt Lake City, Utah

[21] Appl. No.: 657,158

[22] Filed: Feb. 11, 1976

[51] Int. Cl.² .................. F16H 7/22; F16H 9/08; F16H 9/24
[52] U.S. Cl. ................................................. 74/217 B
[58] Field of Search ........... 74/217 CV, 217 S, 217 B, 74/217 R, 244, 117; 280/236, 261

[56] References Cited
U.S. PATENT DOCUMENTS

| 679,076 | 7/1901 | Johnston | 74/217 CV |
| 3,782,210 | 1/1974 | Holleman | 280/236 |
| 3,873,128 | 3/1975 | Dunder et al. | 280/236 |
| 3,934,481 | 1/1976 | Foster | 280/236 |

Primary Examiner—Samuel Scott
Assistant Examiner—Allan R. Burke

[57] ABSTRACT

A transmission for a vehicle of the type having a wheel to which power is to be applied to rotate it and a drive means to provide wheel turning power, includes a cone-shaped member with concentric rings of teeth on its surface adapted to be concentrically attached to the wheel to be powered, and a drive sprocket ring encircling the axis of the cone-shaped member and having engagement means thereon adapted to cooperate with a selected ring of teeth on the cone-shaped member. A shifting means is adapted to shift the sprocket ring so that the engagement means may engage any of the rings of teeth selected. The ring of teeth selected determines the ratio of the transmission.

3 Claims, 6 Drawing Figures

U.S. Patent     Nov. 1, 1977     4,056,013
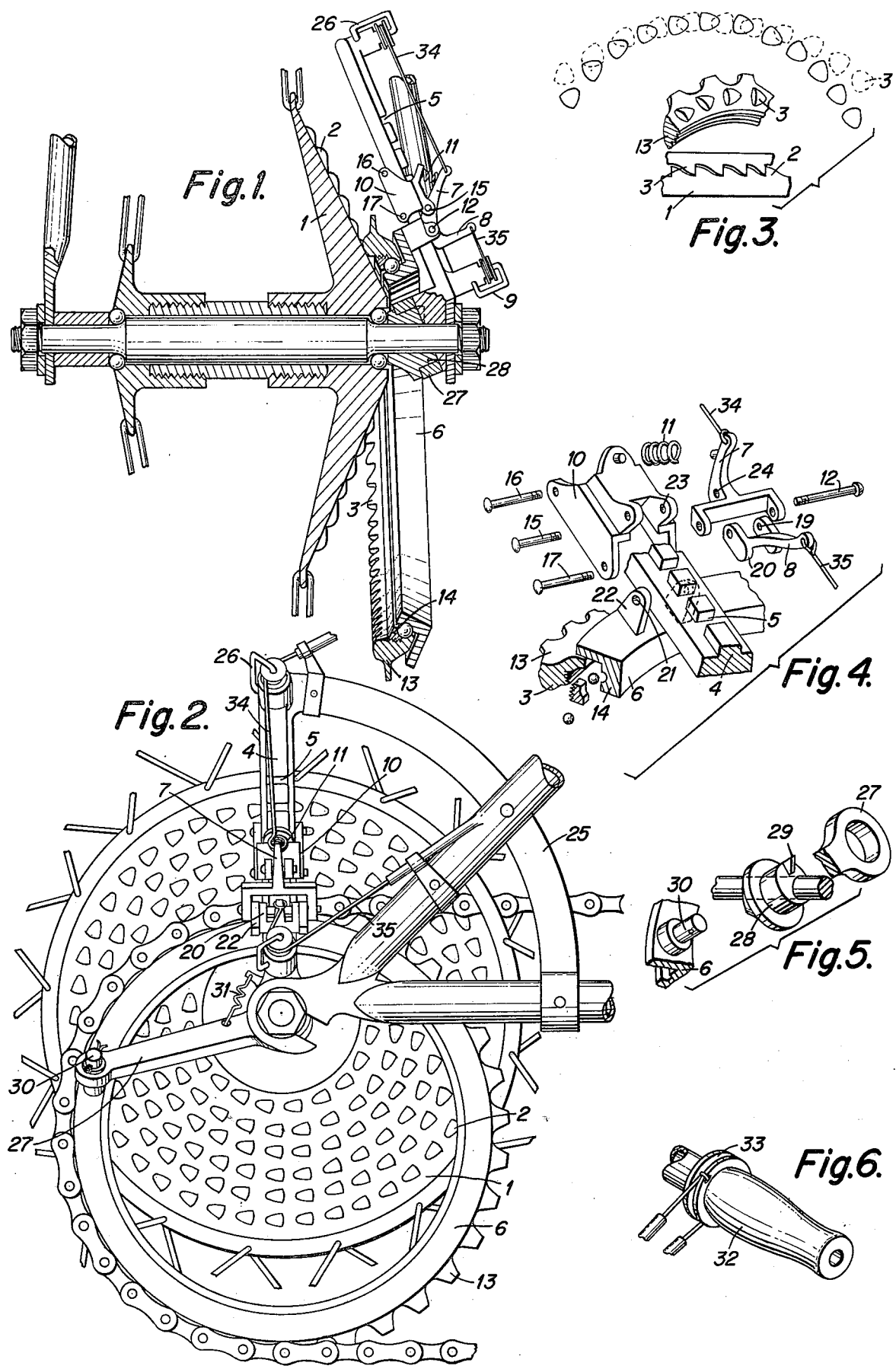

BICYCLE TRANSMISSIONS

This invention relates to transmissions for racing bicycles, and is intended to improve on the performance and operation of the derailleure at a considerable savings in cost to manufacturer and consumer. Having only one fourth as many parts, (no shift on pedal sprocket, no chain take-up pulleys, or free wheel ratchet), excess weight is reduced, and there is virtually no possibility of malfunction. Shifting can be done moving or standing with the convenience of a twist grip handlebar control, and there is no danger of misalignment whether or not control cables have slack in them. With the elimination of chain take-up pulleys, the inefficiency of passing the chain through them is eliminated. This transmission involves virtually no mechanical losses nor problem of wear provided dimensions and contours are correct.

While coasting, the cyclist may retract the shift mechanism from the wheel if he wishes, by a slight turn of the twist grip, so free wheeling is complete without even the impediment of pawls.

Gear selection can cover a broad range with six or more gears to choose from for every condition.

In essence this shift is the same in concept as gearing with meshing internal and external gears. However the gear teeth are slanted and contoured to operate in one direction only, allowing slippage when pedal speed is below that required to drive the wheel. Six concentric rings of teeth project from the wheel hub which has a conical shape offsetting each ring laterally to prevent any interference in the use of one gear from another. The driving shift element involves a sprocket ring mounted on a ball bearing ring which passes around the rear wheel axle between the hub and the frame. This sprocket-ball bearing ring lies parallel to the rear wheel and is mounted on a movable armature which is tilted to track parallel to the conical slope of the hub. The ring is positioned along a brace which lies parallel to the conical hub slope. This brace has lateral slots along its length, one for each gear ring of the hub, and spring pressure directs the sprocket-ball bearing ring to contact the hub when the locating pin slips into one or another of these brace slots. The control cables attatch at opposite ends of the shift mechanism and pass around the twist grip so that when the cable on one side is retracted, the opposite cable is played out.

Following is a description of the invention as illustrated in the accompanying drawings.

FIG. 1 is a rear sectional view of the shift showing the conical hub with teeth projecting to the right, and sprocket-ball bearing ring passing around the rear axle and affixed to the slanting positioning brace, with control cables affixed to the shift mechanism.

FIG. 2 is a right side view of the hub, sprocket-ball bearing ring, positioning brace and shift mechanism, and also the tilted parallel tracking armature between axle and ring.

FIG. 3 shows the merging of driving and driven teeth, a perspective view of the sprocket ring segment and teeth, and a profile of meshing teeth.

FIG. 4 is a disassembled perspective view of the parts of the shift mechanism and shows segments of the positioning brace and sprocket-ball bearing ring.

FIG. 5 shows a segment of the parallel tracking armature and its tilted bearings on rear axle and sprocket-ball bearing ring.

FIG. 6 shows the twist grip with control cable passing around it and extending from either side.

As shown in FIG. 1, hub 1 has a conical form with 6 concentric rings of teeth 2 (see FIG. 2) projecting to the right. Bearing ring 6, with sprocket ring 13 mounted on it, lies in a plane parallel to the rear wheel between brace 4 and hub 1. Teeth 3 of sprocket ring 13 project out from the left side of ring 13. Armature 27 (FIGS. 2 and 5) is mounted on tilted bearing 28 on the rear wheel axle and extends out and attaches to tilted pin 30 which projects outward from the outside face of ring 6. The attitudes of bearings 28 and 30 are approximately parallel to one another, and approximately perpendicular to the slant of brace 4 and the line of contact of ring 13 with hub 1, which lies directly under brace 4 as shown in FIG. 2.

As best seen in FIG. 4, ring 6 has projections 22 which pass on either side of brace 4. Pin 12 passes through holes 18 and 19 of rocker arms 7 and 8 and also through holes 21 of projections 22 (one concealed behind 4). Rocker arm 7 pivots on pin 15 which passes through holes 23 of guide 10 and hole 24 of rocker arm 7. Rocker arm 8 pivots on edges 20 which press against brace 4 on either side of slots 5. Spring 11, between guide 10 and rocker arm 7 applies an outward force to rocker arm 7. This transmits an inward force to ring 6 and sprocket ring 13 by means of pin 12 to which ring 6 is attached at projections 22. The strength of spring 11 and attitudes of rocker arms 7 and 8 are such that when either cables 34 or 35 are pulled, the rocker arms will force pin 12 to disengage from any slot 5, disengaging teeth 3 from teeth 2 of hub 1. The strength of spring 11 is such that it will not depress except when there is a resistance to motion in the direction of cable pull. This resistance is presented by the walls of slots 5 against pin 12, and as a result of it, pin 12 will pivot out and clear of slot 5 and be free to move to another slot 5, relocating the ring assembly 6-13-14. Pin 12 will always descend at least part way into each slot 5 so that the cyclist can readily detect each gear position from the change in pull on the cable as he twists twist grip 32, retracting one cable while extending the other. Therefore there is no need for an indicator on the twist grip or problem concerning cable slack. However it is very important that slots 5 be deep enough so that they will engage pin 12 before there is contact between teeth 2 and 3. Otherwise in sliding over one another before pedalling begins, pin 12 may be ejected from slot 5. The cyclist should reverse twist the grip slightly to allow pin 12 to dropTfully into the desired slot.

Teeth 2 and 3 are curved and contoured so that they can readily slide over one another whenever the sprocket is turning slower than the wheel. However, whenever the cyclist coasts, he simply twists the twist grip part way between two gear positions. As a result, pin 12 will rest on brace 4 between slots 5, allowing no contact between teeth 2 and 3.

The hole at the rear of arm 27 into which pin 30 passes, should be circular at bottom, but slightly oval at top, in the direction away from the center so as to allow the tilting of ring assembly for shifting. Also for shifting, hole 21 of projection 22 should also be slightly oval and the sides of projections 22 should bevel off slightly from center to allow for the slight tipping in the plane of the ring assembly which results from armature 27 swinging through an arc while the shift mechanism moves in a straight line.

Spring 31 (FIG. 2) absorbs some of the weight of the chain and ring assembly to facilitate shifting in an upward direction.

Due to the large diameters and gradual divergence of the meshing gear rings, there is very little friction. The engaging edges of the meshing teeth should have curvature to minimize rubbing contact.

Element 14 is a threaded ring which is screwed onto sprocket 13 so as to comprise the inside retaining wall for the ball bearing race on which ring 13 rides.

What is claimed is:

1. A transmission for a vehicle of the type having a wheel to which power is to be applied to rotate it, drive means to provide wheel-turning power, and shifting means, said transmission including a cone-shaped member adapted for mounting on a wheel of a vehicle of the said type, concentrically about the axis thereof; concentric, ring-like sets of teeth formed on the cone-shaped member's tapered surface; a sprocket ring encircling the axis of said cone-shaped member and adapted to be rotatably mounted on the shifting means of the vehicle; the sprocket ring being adapted to be driven by the drive means of the vehicle and always lying and being shifted in a plane perpendicular to the axis of said wheel of the vehicle; engagement means on one side of said sprocket ring and adapted to cooperate with the ring-like sets of teeth on said cone-shaped member, said sprocket ring being shiftable both toward the cone-shaped member and radially toward or away from the axis of said cone-shaped member, so as to permit the engagement means to cooperate with a different set of ring teeth for purposes of ratio change.

2. A transmission according to claim 1, wherein the engagement means and ring-like sets of teeth are constructed to engage and transmit forward rotational force from the sprocket ring to the wheel when the sprocket ring is rotating in a forward direction as a unit with the wheel, but to slide over one another if the forward rotational speed of the wheel is greater than that of the sprocket ring.

3. A transmission according to claim 1, wherein the sprocket ring includes a stationary ring adapted to be attached to the vehicle frame and to move with the sprocket ring in the shifting of said sprocket ring; and wherein the sprocket ring is mounted on anti-friction bearings.

* * * * *